(12) United States Patent
Packard, III et al.

(10) Patent No.: US 9,017,093 B1
(45) Date of Patent: Apr. 28, 2015

(54) ELECTRIC METER SOCKET ASSEMBLY

(71) Applicant: Cooper Technologies Company, Houston, TX (US)

(72) Inventors: Duan Earl Packard, III, Sherman, TX (US); Daniel Wayne Vosbrink, Collinsville, IL (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 14/098,216

(22) Filed: Dec. 5, 2013

(51) Int. Cl.
  *H01R 13/00* (2006.01)
  *H01R 33/945* (2006.01)
  *G01R 1/04* (2006.01)

(52) U.S. Cl.
  CPC .................................. *G01R 1/0416* (2013.01)

(58) Field of Classification Search
  CPC .... H01R 13/113; H01R 31/08; H01R 13/112; H01R 12/00; G01R 1/046; G01R 15/18; A01B 12/006; H05K 7/20; G05D 7/00; H02B 1/00; G06F 17/50
  USPC .......................................... 439/517, 485–487
  See application file for complete search history.

(56) References Cited

U.S. PATENT DOCUMENTS

| | | | |
|---|---|---|---|
| 2,931,879 A | 4/1960 | Waldrop | |
| 3,131,984 A | 5/1964 | Kobryner | |
| 3,221,216 A | 11/1965 | Kobryner | |
| 3,394,340 A | 7/1968 | Kobryner | |
| 3,628,097 A | 12/1971 | Kobryner | |
| 3,731,253 A | 5/1973 | Coffey | |
| 3,735,332 A | 5/1973 | Tirrell | |
| 4,104,588 A | 8/1978 | Westberry | |
| 4,237,521 A * | 12/1980 | Denker | 361/697 |
| 4,690,483 A | 9/1987 | Carris | |
| RE35,077 E * | 10/1995 | Allina | 361/56 |
| 5,596,468 A * | 1/1997 | Allina | 361/56 |
| 5,774,317 A | 6/1998 | Allina | |
| 6,152,764 A * | 11/2000 | Robinson et al. | 439/517 |
| 6,549,388 B2 | 4/2003 | Robinson | |
| 6,561,844 B1 | 5/2003 | Johnson | |
| 6,592,399 B2 | 7/2003 | Robinson et al. | |
| 6,633,476 B1 * | 10/2003 | Allina | 361/118 |
| 6,931,893 B2 | 8/2005 | Agbay | |
| 7,142,412 B2 | 11/2006 | Witherbee et al. | |
| 7,291,042 B2 | 11/2007 | Johnson | |
| 7,476,108 B2 * | 1/2009 | Swain et al. | 439/79 |
| 7,503,800 B2 | 3/2009 | Siglock et al. | |
| 7,522,406 B2 * | 4/2009 | Seff et al. | 439/517 |

(Continued)

FOREIGN PATENT DOCUMENTS

WO 2012112975 A3 8/2012

*Primary Examiner* — Briggitte R Hammond
(74) *Attorney, Agent, or Firm* — Senniger Powers LLP

(57) ABSTRACT

An electric meter socket assembly for an electric meter includes a female electrical contact defining a slot for receiving a male electrical contact of an electric meter to electrically connect to the electric meter. In one example, the male contact guide is in thermal contact with the female electrical contact and is configured to facilitate insertion of the male electrical contact of the electrical meter into the slot defined by the female electrical contact. The male contact guide includes a plurality of heat sink fins configured to dissipate heat generated from resistive heating of the female electrical contact. In another example, an anti-rotation stop configured to inhibit rotation of the female electrical contact relative to a mounting member on which the female electrical contact is to be mounted.

20 Claims, 10 Drawing Sheets

(56) References Cited

U.S. PATENT DOCUMENTS

| | | | |
|---|---|---|---|
| 7,559,793 B1 * | 7/2009 | Zhang et al. | 439/517 |
| 7,614,908 B2 | 11/2009 | Zhang | |
| 7,621,775 B1 | 11/2009 | Michaud et al. | |
| 7,850,483 B2 | 12/2010 | Siglock et al. | |
| 8,040,664 B2 | 10/2011 | Makinson et al. | |
| 8,218,295 B1 | 7/2012 | Shoemaker et al. | |
| 8,602,814 B2 | 12/2013 | Packard, III et al. | |
| 2001/0021605 A1 | 9/2001 | Bolam | |
| 2007/0091548 A1 * | 4/2007 | Voisine | 361/663 |
| 2009/0247005 A1 | 10/2009 | Zhang et al. | |
| 2010/0321003 A1 * | 12/2010 | Geiger et al. | 324/127 |
| 2010/0323555 A1 | 12/2010 | Geiger et al. | |
| 2011/0004357 A1 * | 1/2011 | Mathiowetz | 361/724 |
| 2012/0214334 A1 | 8/2012 | Packard, III et al. | |

\* cited by examiner

ELECTRIC METER SOCKET ASSEMBLY

FIELD OF THE INVENTION

The present invention generally relates to a blade guide for an electric meter socket assembly, an electric meter socket assembly including the blade guide, and an electric meter socket subassembly including the blade guide.

BACKGROUND OF THE DISCLOSURE

Meters are used to measure electricity usage. For example, a meter may be connected to power lines entering a building to measure electricity usage in the building. An electric meter socket assembly is mounted on the building to connect the meter to the power lines. The meter socket assembly includes a meter socket sub-assembly secured within an enclosure. The meter socket subassembly includes terminals to which the power lines are electrically connected, and jaw contacts corresponding to the respective terminals for receiving blade connectors extending from the electric meter. The terminals and the jaw contacts are mounted on an electrically non-conductive base, which is in turn secured to a back wall of an enclosure of the electric meter socket assembly.

The power lines may carry up to 600 volts and 100 to 200 amps of current, for example, through the terminals, the jaw contacts, and the blades on the electric meter. This leads to resistive heating of the meter socket assembly components, particularly at the jaw contacts and the blades which are relatively thin. To reduce the temperature of the electrically conductive components, the prior art solution teaches increasing the thermal mass of the terminals, thereby drawing heat away from the jaw contacts and the blades.

SUMMARY OF THE DISCLOSURE

In one aspect, an electric meter socket assembly for an electric meter generally comprises a female electrical contact defining a slot for receiving a male electrical contact of an electric meter to electrically connect to the electric meter, and a male contact guide in thermal contact with the female electrical contact and configured to facilitate insertion of the male electrical contact of the electrical meter into the slot defined by the female electrical contact. The male contact guide includes a plurality of heat sink fins configured to dissipate heat generated from resistive heating of the female electrical contact.

In another aspect, an electric meter socket assembly for an electric meter generally comprises a female electrical contact having an upper end, a bottom wall, and opposite first and second sides. The female electrical contact defines a slot extending between the first and second sides for receiving a male electrical contact of an electric meter to electrically connect to the electric meter. An anti-rotation stop at the second side of the female electrical contact extends downward below the bottom wall of the female electrical contact. The anti-rotation stop is configured to inhibit rotation of the female electrical contact relative to a mounting member on which the female electrical contact is to be mounted.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE DRAWINGS

Figure 1:
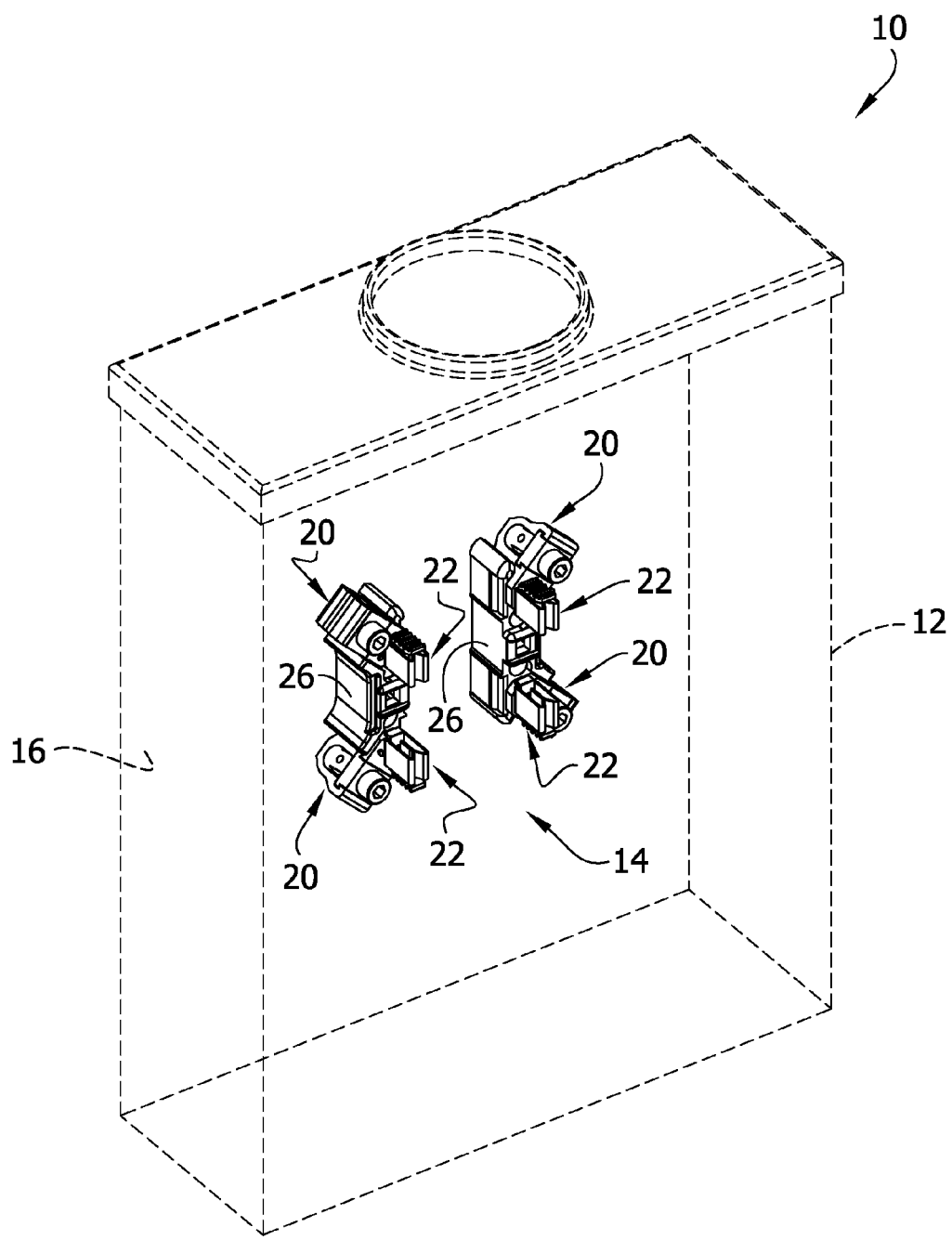
FIG. 1 is a perspective of a meter socket assembly, an enclosure of the meter socket assembly shown in broken lines for illustrative purposes.

Referring to FIG. 1, one embodiment of an electric meter socket assembly is generally indicated at reference numeral 10. The illustrated meter socket assembly 10 includes an enclosure 12 (e.g., an electrically conductive enclosure, such as a metal enclosure), and a meter socket sub-assembly, generally indicated at 14, secured to a back wall 16 within the enclosure. The meter socket sub-assembly 14 includes a plurality (e.g., four to five) of electrically-conductive power line terminals, each indicated generally at reference numeral 20, and a plurality (e.g., 4-5) of electrically-conductive female electrical contacts, each indicated generally at reference numeral 22. Each power line terminal 20 is configured for electrical connection to a power line, and each female electrical contact 22 is electrically connected to one of the power line terminals and configured to receive a male electrical contact (e.g., a blade contact, not shown) extending from the electric meter (not shown). The power line terminals 20 and the female electrical contacts 22 are mounted on an electrically non-conductive base 26, which is in turn secured to the back wall 16 of the enclosure 12.

Figure 2:
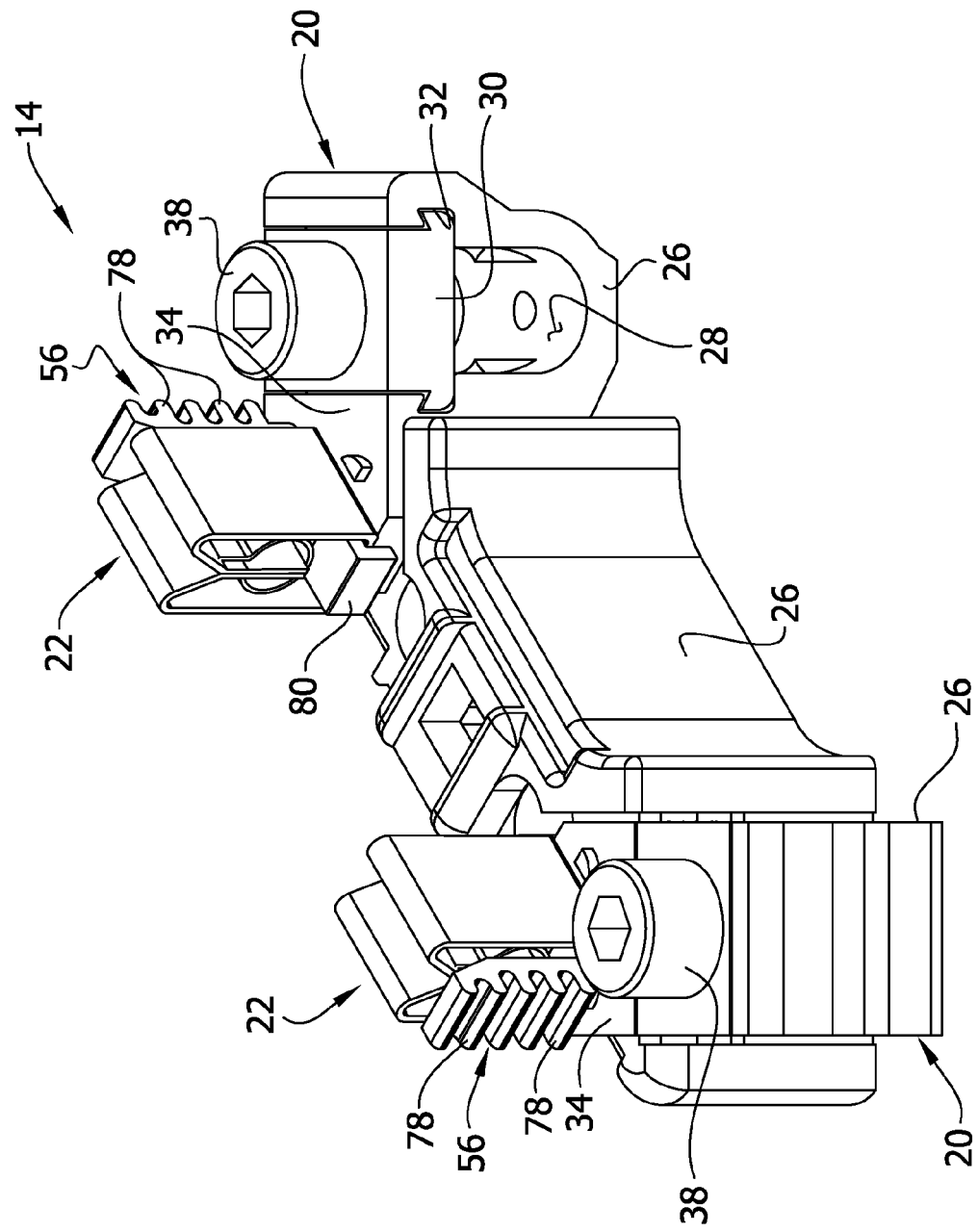
FIG. 2 is a perspective of a sub-assembly of the meter socket assembly.
Figure 3:
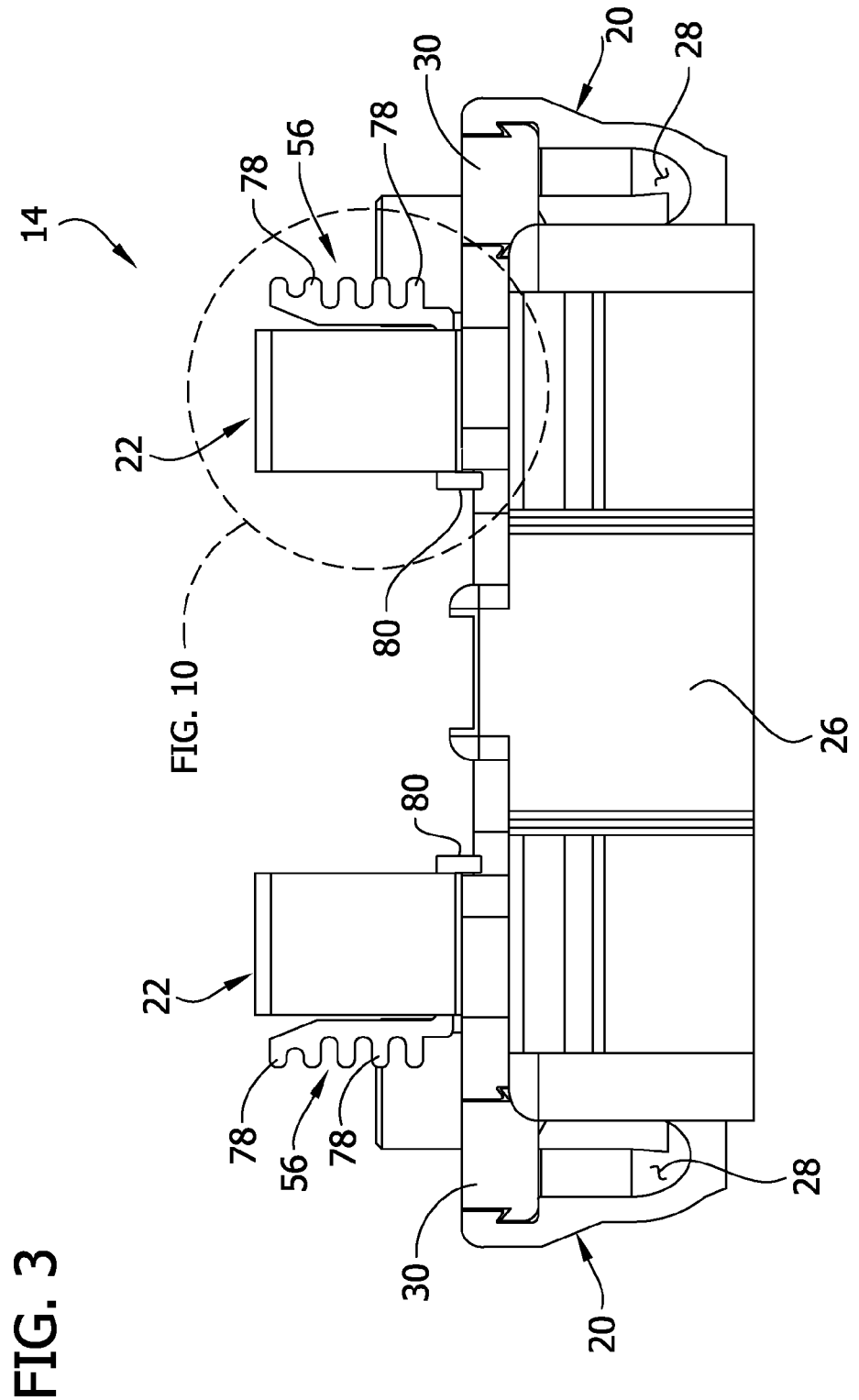
FIG. 3 is a front elevation of the sub-assembly.
Figure 4:
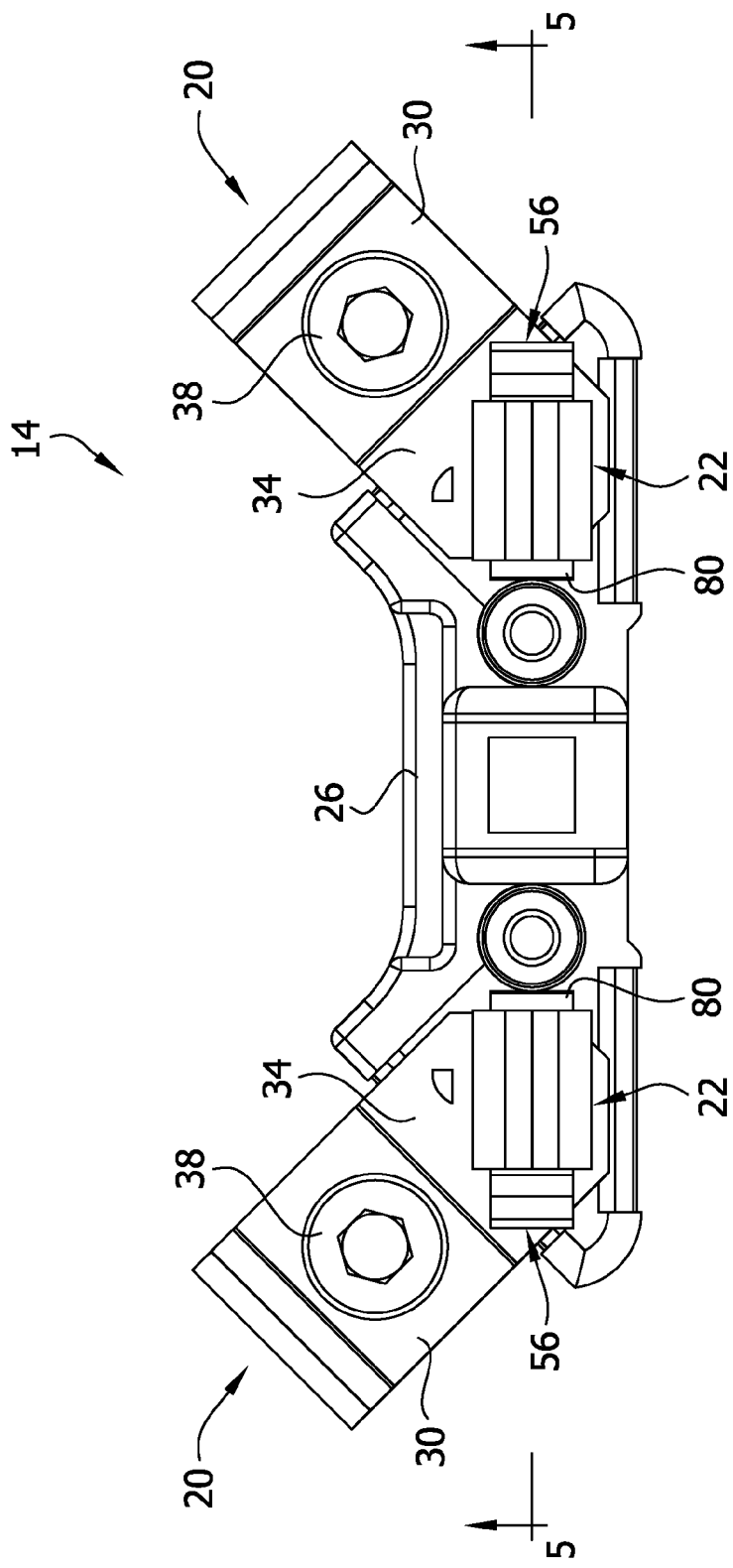
FIG. 4 is a top plan of the sub-assembly.

Referring to FIG. 2, one part of the of the meter socket sub-assembly 14, including two of the four power line terminals 20 and two of the four female electrical contacts 22, is shown for ease of disclosure. In the illustrated embodiment, each power line terminal 20 includes a generally U-shaped terminal body 26 defining a channel 28, a cap 30 slidably received in a track 32 defined by an upper portion of the body, and a mounting member 34 extending laterally outward from the body adjacent the upper portion of the body. Each power line (not shown) is securable in the channel 28 of the corresponding terminal body 26 using a fastener 38 (e.g., set screw) threaded in the cap 30 to both electrically and mechanically connect the power line to the terminal body 26. The mounting member 34 of each power line terminal 20 rests on an upper surface of the base 26 and is secured thereto by a fastener 40 (e.g., a bolt), see FIG. 5, extending upward through the upper surface of the base and through an opening in the mounting member 34. The fasteners 40 also secure the female electrical contacts 22 to the mounting members 34 of the power line terminals 20, as explained in more detail below. It is understood that the power line terminals 20 may be of other configurations and types for electrical connection to a power line, without departing from the scope of the present disclosure.

Figure 6:
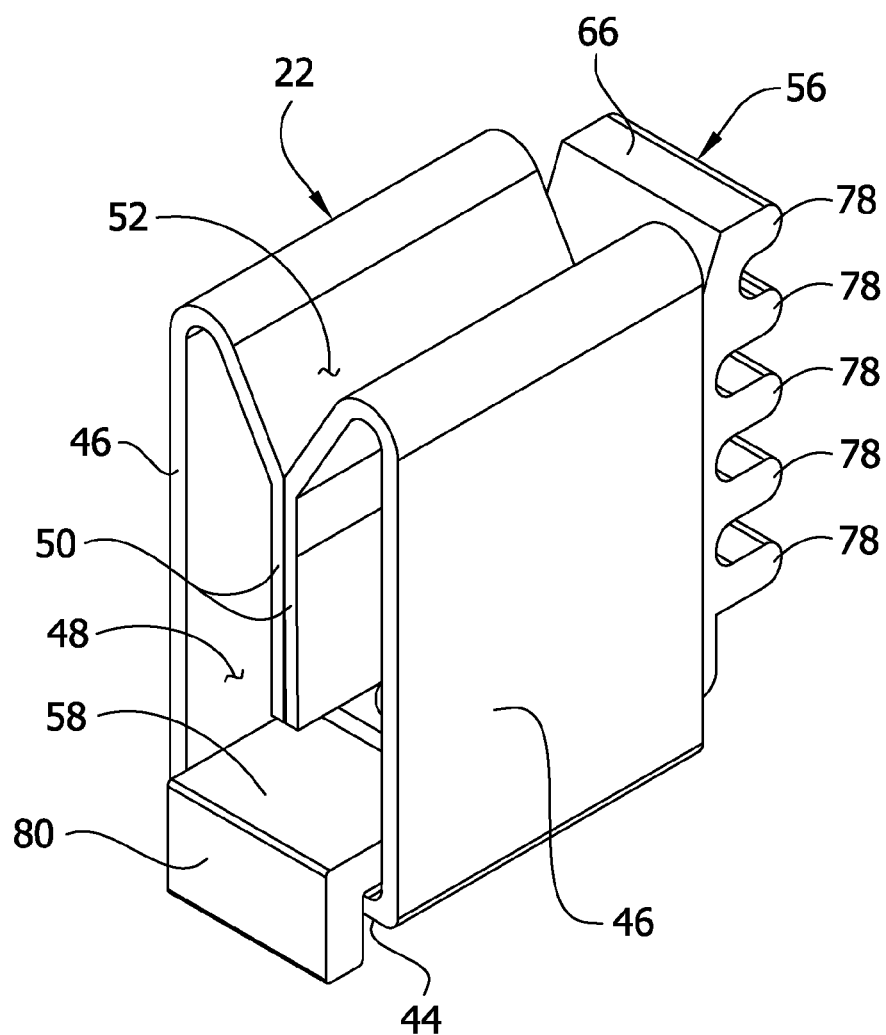
FIG. 6 is an enlarged perspective of a female electrical connector, a male connector guide, and an anti-rotation stop.
Figure 7:
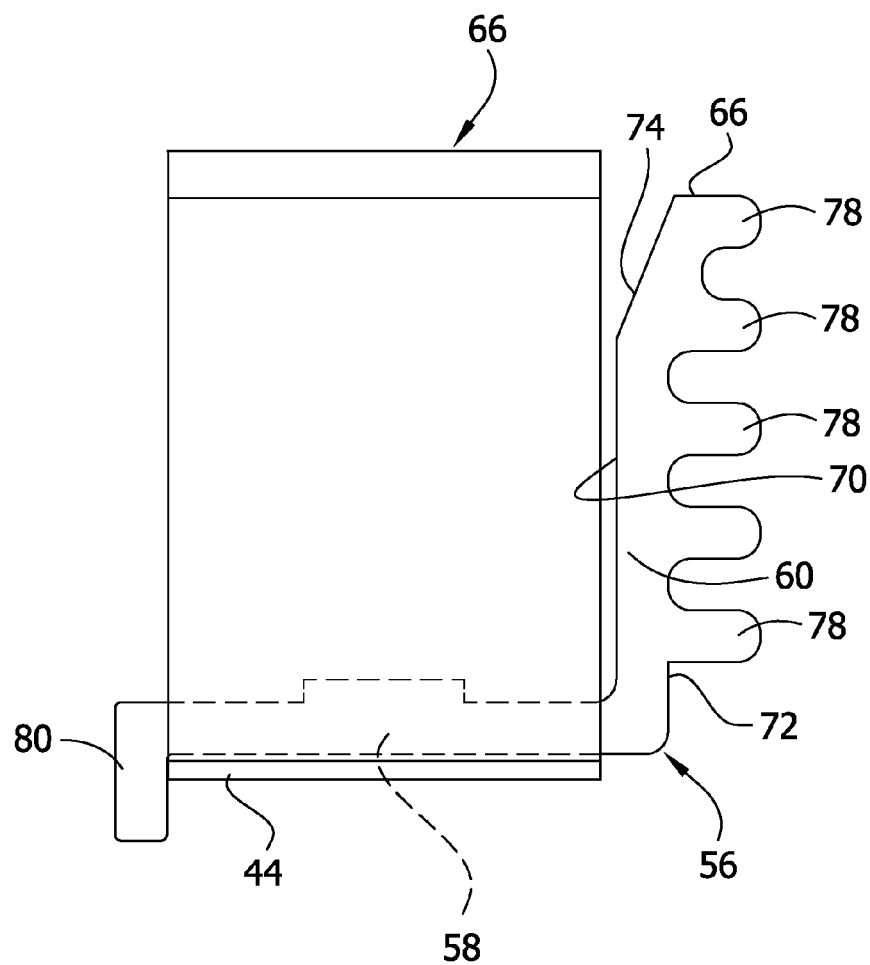
FIG. 7 is a side elevation of FIG. 6.

Referring to FIGS. 6 and 7, a single female electrical contact 22 is shown for ease of disclosure, with the understanding that the following disclosure applies equally to the other female electrical contacts. The illustrated female electrical contact 22 includes a bottom wall 44, opposing jaws 46 extending upward from the bottom wall, and opposite first and second sides (defined by sides of the jaws) that are open to an open interior 48 of the female electrical contact. The jaws 46 have depending lips 50 defining a slot 52 at an upper end of the female electrical contact 22. One of the blades (not shown) of the meter (not shown) is insertable into the slot 52 to electrically connect the meter to the female electrical contact 22. In the illustrated embodiment, the female electrical contact 22 is formed from a single, integral sheet of metal that is bent to form the jaws 46. It is understood that the female electrical contact 22 may be of other configurations and types for connection to a meter, without departing from the scope of the present disclosure.

Figure 5:
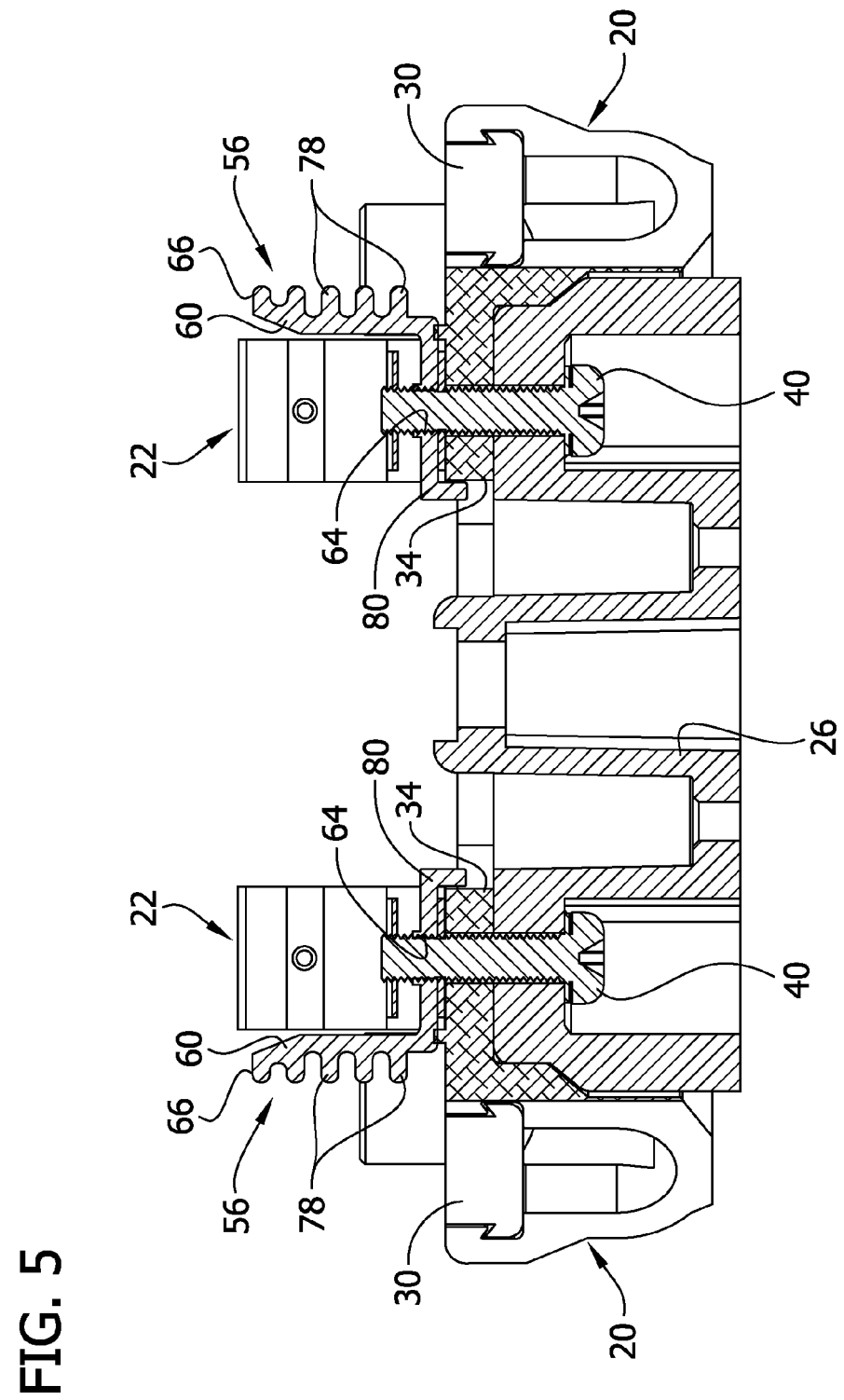
FIG. 5 is a cross section of the sub-assembly taken through the plane defined by the line 5-5 in FIG. 4.
Figure 8:
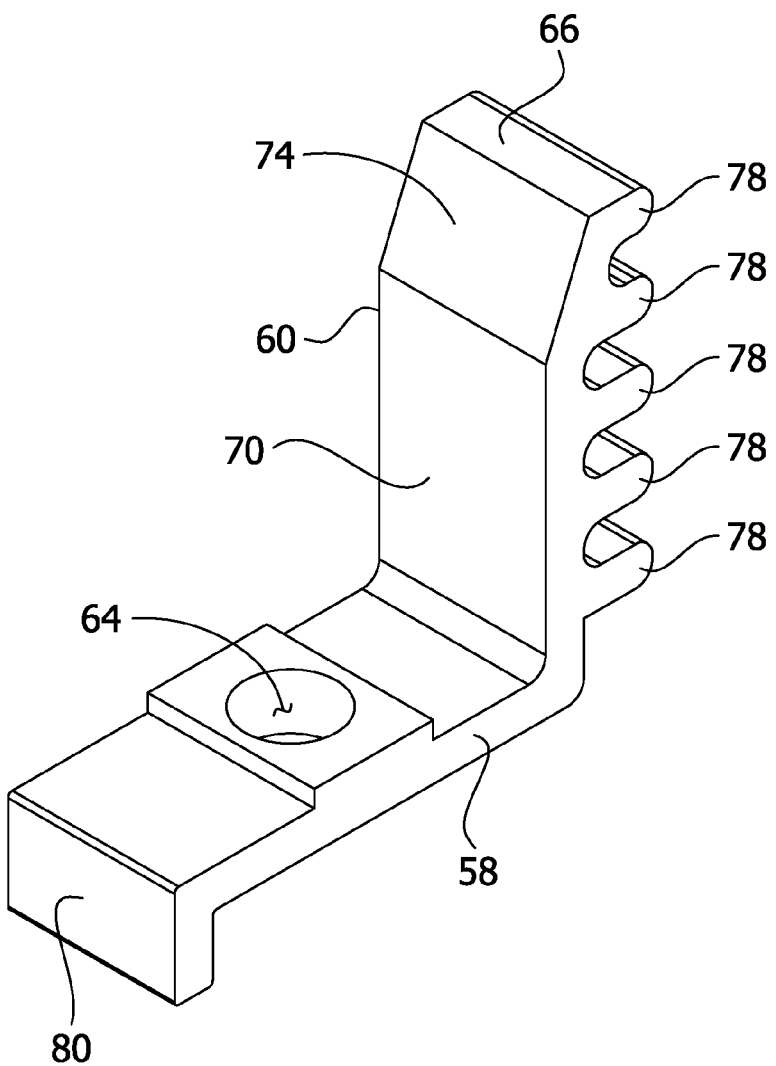
FIG. 8 is an enlarged perspective of an integrally formed component including the male connector guide and the anti-rotation stop.
Figure 9:
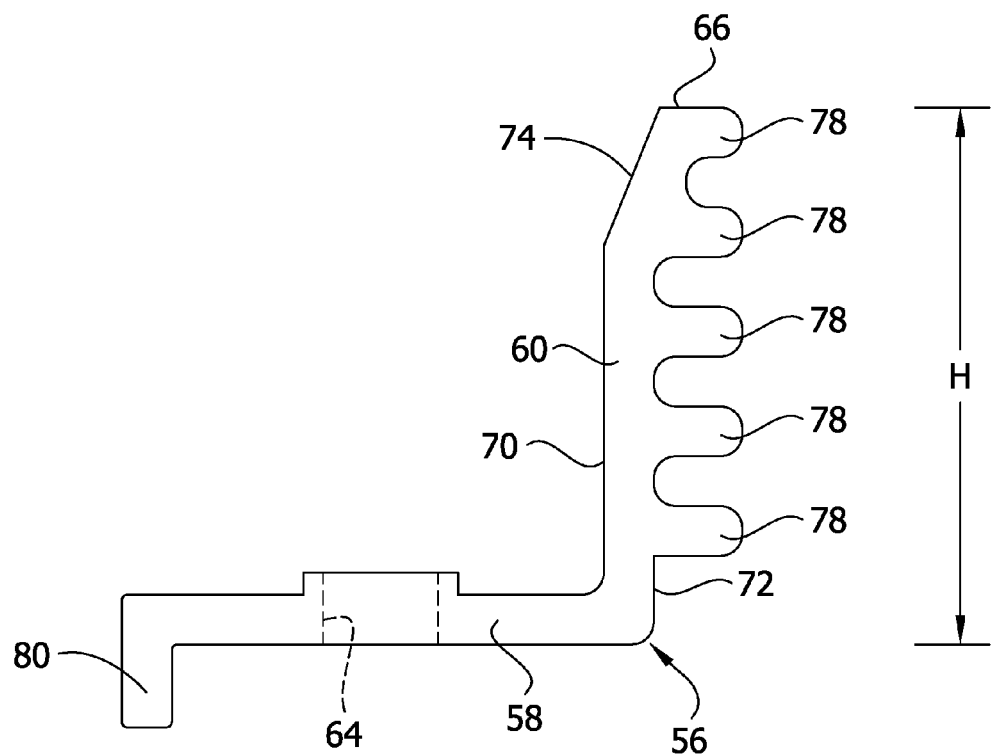
FIG. 9 is a side elevation of FIG. 8.

Referring still to FIGS. 6 and 7, a male contact guide, generally indicated at 56, is secured to each of the female electrical contacts 22. Referring also to FIGS. 8 and 9, the illustrated male contact guide 56 is generally L-shaped, including a base 58 having opposite first and second ends, and a guide member 60 extending upward from adjacent the first end of the base. The base 58 is sized and shape for reception in the interior 48 of the female electrical contact 22 (FIGS. 6 and 7) such that the base is in physical and thermal contact with the bottom wall 44 of the contact and the guide member 60 is disposed outside the contact at the open first side thereof. As shown in FIG. 5, the fastener 40 is threaded into a threaded opening 64 in the base 58 to secure the male contact guide 56 to the female electrical contact 22. The guide member 60 extends upward at the first side of the female electrical contact 22 from adjacent the bottom wall 44 of the contact toward the upper end of the contact. A terminal (upper) end 66 of the guide member 60 is generally adjacent the upper end of the female electrical contact 22. As shown in FIG. 7, the guide member 60 has an inner face 70 in generally opposing relationship with the first side of the female electrical contact 22, and an outer face 72 facing away from the female electrical contact 22. An upper portion 74 of the inner face 70 extends away from the female electrical contact 22 (i.e., is beveled from the upper end 66) to guide and facilitate insertion of the male electrical contact (not shown) into the slot 52 defined by the jaws 46. It is understood that in other embodiments, the male contact guide 56 may be formed integrally with the female electrical contact 22 or the male contact guide may be formed in other ways and/or secured to the female electrical contact in other ways. In particular, it is understood that the male contact guide may not include the base 58, as illustrated, without departing from the scope of the present invention.

A plurality of heat sink fins 78 extend outward from the outer face 72 of the guide member 60 of the male contact guide 56 to facilitate dissipation of heat from the socket sub-assembly 14. The male contact guide 56 is in thermal contact with the female electrical contact 22, meaning that heat is transferred conductively between the male contact guide and the female electrical contact. In the illustrated embodiment, the male contact guide 56 is in direct contact with the female electrical contact 22, although in other embodiments, thermally conductive material may be disposed between the male contact guide and the female electrical contact such that the male contact guide is still in thermal contact with the female electrical contact. Accordingly, each guide member 60 functions as both a guide to facilitate insertion of the corresponding male electrical contact into the female electrical contact 22, and a heat sink for dissipating heat generated by current flowing from the power lines and through the power line terminals 20, the female electrical contacts, and the male electrical contacts of the meter. In the illustrated embodiment (FIG. 9), the fins 78 are spaced apart along a height H of the guide member 60, although in other embodiments the fins may be spaced apart widthwise of the guide member. In the illustrated embodiment, the fins 78 are formed integrally with the guide member 60, and in particular, the fins and the guide member are formed as an integral, one-piece component from a single piece of material. Moreover, in the illustrated embodiment the base 58 is also formed integrally with the guide member 60 and the fins 78, and in particular, the fins, the guide member, and the base are formed from as an integral, one-piece component from a single piece of material. In other embodiments, one or more of the fins 78, the guide member 60, and the base 58 may be formed separately from the remaining components and fastened to one another, such as by welding or on other ways. In one example, the male contact guide 56 is formed from copper alloy, although the guide may be formed from other thermally conductive material for dissipating heat.

Figure 10:
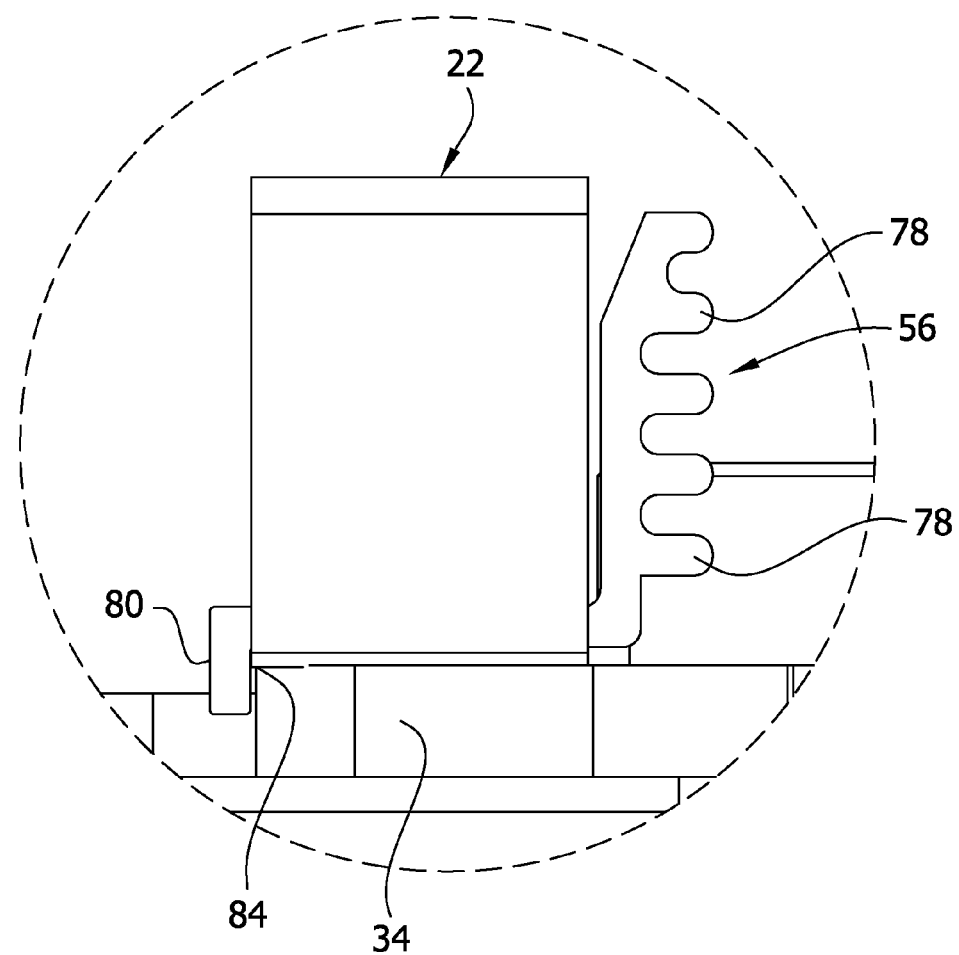
FIG. 10 is an enlarged partial view of FIG. 3.

As shown throughout the drawings, an anti-rotation stop 80 is secured to each of the female electrical contacts 22 for inhibiting rotation of the female electrical contacts relative to the mounting member 34 of the corresponding power line terminal 20. It is understood that in some embodiments, each sub-assembly 24 includes the anti-rotation stops 80 secured to the female electrical contacts 22 but does not include the male contact guides 56, while in other embodiments each sub-assembly includes the male contact guides but does not include the anti-rotation stops. In the illustrated embodiment, each anti-rotation stop 80 depends downward from adjacent the second end of the base 58 of the corresponding male contact guide 56. In particular, the anti-rotation stop 80 comprises a lip depending downward below the bottom wall 44 of the female electrical contact 22. Moreover, when the female electrical contact 22 is secured (e.g., fastened by the fastener 40) to the mounting member 34 of the power line connector 20, the anti-rotation stop 80 extends over an upper edge 84 (shown best in FIGS. 2 and 10) of the mounting member 34 at a junction of upper and side surfaces of the mounting member. The anti-rotation stop 80 is in generally opposing relationship with the side surface of the mounting member 34 such that torque applied to the female electrical contact 22, such as when threading the fastener 40 into the threaded opening 64 of the male contact guide 56, the anti-rotation stop engages the side surface of the mounting member to inhibit rotation of the female electrical contact. Accordingly, the anti-rotation stops 80 facilitate proper positioning of the female electrical contacts 22 within the meter socket assembly 10 to ensure that the male electrical contacts on the meter will properly align with the slots 52 of the female electrical contacts when connecting the meter to the socket assembly.

Having described the invention in detail, it will be apparent that modifications and variations are possible without departing from the scope of the invention defined in the appended claims.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As used throughout the present disclosure with respect to the meter socket assembly, the terms defining relative locations and positions of structures and components of the channel framing, including but not limited to the terms "upper," "lower," "right," "left," "top," and "bottom," are meant to provide a point of reference for such components and structures as shown in the drawings, with the understanding that the respective relative locations of such components and structures will depend on the orientation of the meter socket assembly in use.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An electric meter socket assembly for an electric meter, the meter socket assembly comprising:
   a female electrical contact defining a slot for receiving a male electrical contact of an electric meter to electrically connect to the electric meter; and
   a male contact guide in thermal contact with the female electrical contact and configured to facilitate insertion of the male electrical contact of the electrical meter into the slot defined by the female electrical contact, the male contact guide including a plurality of heat sink fins configured to dissipate heat generated from resistive heating of the female electrical contact.

2. The electric meter socket assembly set forth in claim 1, wherein the female electrical contact includes opposite first and second sides, the male contact guide including a guide member positioned at the first side of the female electrical contact, wherein the heat sink fins are on the guide member.

3. The electric meter socket assembly set forth in claim 2, wherein the male contact guide is secured directly to the female electrical contact.

4. The electric meter socket assembly set forth in claim 3, wherein the female electrical contact has an open interior and the opposite first and second sides of the female electrical contact are open to the interior, the male contact guide including a base secured in the interior of the female electrical contact, wherein the guide member extends upward from the base along the first side of the female electrical contact.

5. The electric meter socket assembly set forth in claim 4, wherein the female electrical contact has a bottom wall and opposing jaws extending upward from the bottom wall and defining the slot, wherein the base of the male contact guide is secured to and in thermal contact with the bottom wall of the female electrical contact.

6. The electric meter socket assembly set forth in claim 1, wherein the female electrical contact includes opposite first and second sides, the male contact guide including a guide member at the first side of the female electrical contact, the guide member having an inner face generally facing the first side of the female electrical contact, and an outer face generally facing away from the first side of the female electrical contact, wherein the heat sink fins extend outward from the outer face of the guide member.

7. The electric meter socket assembly set forth in claim 6, wherein the female electrical contact has an upper end defining the slot, wherein the guide member has a height extending toward the upper end of the female electrical contact, the heat sink fins spaced apart from one another along the height of the guide member.

8. The electric meter socket assembly set forth in claim 1, wherein the female electrical contact has an upper end defining the slot, a bottom wall, and a pair of opposite first and second sides, wherein the male contact guide includes a guide member at the first side of the female electrical contact and extending upward from adjacent the bottom wall toward the upper end of the female electrical contact, the guide member configured to facilitate insertion of the male electrical contact of the electrical meter into the slot defined by the female electrical contact, and
   wherein the electric meter socket assembly further includes an anti-rotation stop at the second side of the female electrical contact and extending downward below the bottom wall of the female electrical contact, the anti-rotation stop configured to inhibit rotation of the female electrical contact relative to a mounting member on which the female electrical contact is to be mounted.

9. The electric meter socket assembly set forth in claim 8, further comprising a power line terminal adapted to electrically and mechanically connect to a power line, wherein the power line terminal is electrically connected to the female electrical contact, the power line terminal including a mounting member having an upper surface, a side surface extending downward from the upper surface, and an upper edge at a junction of the upper and side surfaces, wherein the female electrical contact is mounted on the upper surface of the mounting member such that the anti-rotation stop extends over the upper edge of the mounting member and is in generally opposing relationship with the side surface of the mounting member.

10. The electric meter socket assembly set forth in claim 1, wherein the female electrical contact has an open interior and first and second sides that are open to the interior, wherein the male contact guide includes
   a base having opposite first and second ends and being received in the open interior of the female electrical contact, and
   a guide member extending upward from adjacent the first end of the base, the guide member being disposed outside the female electrical contact at the first side of the female electrical contact, wherein the heat sink fins are on the guide member.

11. The electric meter socket assembly set forth in claim 1, further comprising an electrically non-conductive base on which the female electrical contact and the male contact guide are mounted.

12. The electric meter socket assembly set forth in claim 11, further comprising an enclosure, wherein the electrically non-conductive base is secured inside the enclosure.

13. The electric meter socket assembly set forth in claim 1, further comprising a power line terminal adapted to electrically and mechanically connect to a power line, wherein the power line terminal is electrically connected to the female electrical contact.

14. An electric meter socket assembly for an electric meter, the meter socket assembly comprising:
   a female electrical contact having an upper end, a bottom wall, and opposite first and second sides, the female electrical contact defining a slot extending between the first and second sides for receiving a male electrical contact of an electric meter to electrically connect to the electric meter; and
   an anti-rotation stop at the second side of the female electrical contact and extending downward below the bottom wall of the female electrical contact, the anti-rotation stop configured to inhibit rotation of the female electrical contact relative to a mounting member on which the female electrical contact is to be mounted.

15. The electric meter socket assembly set forth in claim 14, further comprising a power line terminal adapted to electrically and mechanically connect to a power line, wherein the power line terminal is electrically connected to the female electrical contact, the power line terminal including a mounting member having an upper surface, a side surface extending downward from the upper surface, and an upper edge at a junction of the upper and side surfaces, wherein the female electrical contact is mounted on the upper surface of the mounting member such that the anti-rotation stop extends over the upper edge of the mounting member and is in generally opposing relationship with the side surface of the mounting member.

16. The electric meter socket assembly set forth in claim 15, further comprising an electrically non-conductive base, wherein the mounting member of the power line terminal is mounted on the base.

17. The electric meter socket assembly set forth in claim 16, further comprising an enclosure, wherein the electrically non-conductive base is secured inside the enclosure.

18. The electric meter socket assembly set forth in claim 14, further comprising a male contact guide configured to facilitate insertion of the male electrical contact of the electrical meter into the slot defined by the female electrical contact, wherein the male contact guide is in thermal contact with the female electrical contact and includes a plurality of heat sink fins configured to dissipate heat generated from resistive heating of the female electrical contact.

19. The electric meter socket assembly set forth in claim 14, further comprising a male contact guide configured to facilitate insertion of the male electrical contact of the electrical meter into the slot defined by the female electrical contact,
   wherein the male contact guide includes a base having opposite first and second ends, and a guide member extending upward from adjacent the first end of the base, and
   wherein the anti-rotation stop depends downward from adjacent the second end of the base.

20. The electric meter socket assembly set forth in claim 19, wherein the female electrical contact has an open interior, and wherein the base is received in the open interior of the female electrical contact and fastened to the bottom wall of the female electrical contact.

* * * * *